United States Patent [19]

Stern

[11] 4,176,162
[45] Nov. 27, 1979

[54] METHOD AND APPARATUS FOR CONSERVATION OF ENERGY IN A THERMAL OXIDATION SYSTEM FOR USE WITH A PRINTING PRESS

[75] Inventor: Nathan Stern, Caldwell, N.J.

[73] Assignee: Bobst-Champlain, Inc., Roseland, N.J.

[21] Appl. No.: 814,145

[22] Filed: Jul. 11, 1977

[51] Int. Cl.² .................. B01D 53/34; F23G 7/06
[52] U.S. Cl. .................. 423/210; 101/416 R; 431/5; 432/72; 422/109; 422/111; 422/168
[58] Field of Search .................. 423/210, 245, 212; 23/277 C; 101/1, 416 R, 416 A, 416 B, 152; 432/72; 431/5

[56] References Cited

U.S. PATENT DOCUMENTS

| | | | |
|---|---|---|---|
| 1,603,760 | 10/1926 | Furkert | 101/416 A |
| 2,268,988 | 1/1942 | Hess et al. | 101/416 R |
| 2,651,992 | 9/1953 | Sauberlich | 101/416 R |
| 3,086,353 | 4/1963 | Ridgeway | 423/212 X |
| 3,090,675 | 5/1963 | Ruff et al. | 423/212 X |
| 3,172,251 | 3/1965 | Johnson | 423/212 X |
| 3,211,534 | 10/1965 | Ridgeway | 423/212 X |
| 3,214,246 | 10/1965 | Ridgeway | 423/212 X |

Primary Examiner—Earl C. Thomas
Attorney, Agent, or Firm—James & Franklin

[57] ABSTRACT

Solvents evaporated from ink solutions in the drying sections of a multi-station printing press are converted into harmless gases by heating in an oxidation chamber. The amount of energy required to maintain the oxidation temperature is substantially reduced by preheating the exhaust by passing same through a previously heated bed of ceramic heat exchanger elements prior to introduction into the oxidation chamber. At high solvent concentration levels, preheating to the ignition temperature may result in excess heat of combustion being generated which is detrimental to the oxidation chamber structure. In order to regulate the heat generated, a portion of the heat exchanger bed is bypassed by a regulated amount of exhaust. Alternatively, the solvent concentration level of the exhaust can be lowered by mixing same with the floor sweep exhaust (of substantially lower solvent concentration) in regulated proportions in order to control the amount of heat of combustion generated during preheating. The latter method has the advantage of providing floor sweep capability without increased cost.

16 Claims, 7 Drawing Figures

METHOD AND APPARATUS FOR CONSERVATION OF ENERGY IN A THERMAL OXIDATION SYSTEM FOR USE WITH A PRINTING PRESS

The present invention relates to a thermal oxidation system for use with a multi-color rotogravure packaging/printing press or the like, and more particularly, to a method and apparatus for energy conservation in such a thermal oxidation system.

The oxidation system of the present invention is designed primarily for use with rotogravure packaging/printing presses or the like and is therefore described in conjunction with such a press, for purposes of illustration. However, it should be understood that the concepts herein described can be applied to any process where volatile fuel organic solvents are used and normally emitted to the environment. Thus, the present invention should not be construed as limited for use only on printing presses of the type described.

Rotogravure packaging/printing presses are currently widely used by packaging/printers. Air pollution standards require that the solvents present in the exhaust from such a press be removed prior to introduction of the exhaust to the environment. Moreover, it is necessary, to ensure the health of the individuals present in the pressroom during operation of the press, to continuously remove the solvent laden air from the floor of the pressroom. Unfortunately, a large amount of energy is required to perform these tasks with existing technology.

Two approaches are available for removing organic solvents from the exhaust of a rotogravure printing unit. The first method, commonly known as solvent recovery, passes the solvent laden exhaust through an activated carbon bed, which, by means of an ion exchange process, retains the organic materials. Usually two beds are provided, with one "on stream" and the other in a recycled mode. Steam is used to purge the organic materials from the recycling bed and produce a water solvent mixture. The mixture is then separated in a decanter, and, if possible, the solvent reused.

The second method for removing solvents is to utilize the organic solvents as a means of fuel by bringing the air stream from the exhaust to a temperature about 1400° F. If the gases are held at this temperature for about 0.6 seconds over 99% of the solvents are converted into harmless water vapor and carbon dioxide.

The solvent recovery method is economically feasible only for ink preparations which are soluble in aliphatic hydrocarbon solvents and insoluble in water and which have a specific gravity of less than one. These kinds of solvents can be recovered in their pure form through simple decanting and can be reused.

However, for the packaging industry, the inks utilized are often soluble in various organic solvents, as well as in water. Since each day totally different products are produced using various combinations of a variety of different solvents, if solvent recovery was used, distillation of the end product would be required. Depending upon the product being processed and combination of the solvents used, various azeotropes (a combination of two different liquids which exhibits a lower or a higher boiling temperature than either of the pure components) would be produced. Because of the nature of these chemicals, it is impossible to distill the various solvents in pure form. This, therefore, precludes the reuse of the end product. Thus, solvent recovery cannot be used with these types of inks and the solvents must be oxidized to purify the exhaust.

A variety of different thermal oxidation systems have been utilized. One type of system utilizes a common afterburner. Unfortunately, such an afterburner system is not practical because it has excessively high energy requirements. A heat exchanger can be used to recover some of the energy of the exhaust from the afterburner. However, while this system is an improvement over the common afterburner, from an energy point of view, it is disadvantageous because of high maintenance costs and the inability to make same efficient with widely varying solvent concentrations. A catalytic afterburner has also been developed. The addition of the appropriate catalyst provides the ability to oxidize the organic materials at considerably lower temperatures. However, while energy requirements are reduced in this system, the catalytic beds are expensive and also require high maintenance.

Another concept that has been employed for pollution control is the use of thermal oxidation combined with energy recovery. This system involves heating the exhaust in a chamber to the required 1400° F. level for a given time period with recovery from the exhaust of sufficient BTU's to heat oil, which is then used to preheat the process air in the dryer. Usually, the energy required for process air heating is small in comparison to the energy used to heat the process air to the 1400° F. level. Combining the two requirements has led to numerous difficulties with little success.

It has been recognized that it would be ideal to recover the heat generated in the exhaust of the thermal oxidizing unit, since this is the area where all thermal oxidizing units are deficient in energy conversation. The most efficient method of recovering the heat generated is an old concept employed in steel and glass furnaces, commonly referred to as the pebble bed heat generator. One application of such a system to eliminating solvents in exhaust gases is described by James Mueller in his U.S. Pat. No. 3,895,918 issued July 22, 1975.

The pebble bed heat generator is utilized as a preheater. Air is taken from the dryers by blowers and driven through one pebble bed, which has previously been used as the exhaust to the chimney. The input air is preheated, passed through the oxidation chamber, and then returned through a second pebble bed, which recovers the heat from this exhaust, reducing the final temperature of the exhaust. An input-output damper is periodically switched to interchange the preheater from the exhaust, while simultaneously preheating the air with the energy stored in the pebble bed. More than two pebble beds may be used in the same system, if required. Natural gas or other fuel is utilized in the oxidation chamber in order to raise the level of the preheated gases to the oxidation temperature, approximately 1400° F.

In addition to the high thermal efficiency of such a system, the system has several other desirable characteristics. The pebbles in the pebble bed are actually ceramic materials which can withstand very high temperatures. As the solvent laden air flows through the preheated bed, it will release its heat of combustion with the energy absorbed by the ceramic materials, with no detrimental effect to the preheated and the heat of combustion can be utilized to reduce the amount of heat applied in the oxidation chamber. All of the air is preheated to the 1400° F. level and throughly premixed by the structure of the elements in the bed so that the dwell time (approximately 0.6 seconds, for 99% oxidation) can actually start from the time the gas leaves the preheat bed, permitting the entire structure to be substantially smaller.

The high efficiency of the system provides the ability to use a very small burner, reducing energy consumption drastically over any other system currently available. Condensation cannot occur since the temperature of the exhausting air is always higher than the entrance temperature air. The system can be made extremely efficient when heating air with little solvent content, permitting same to be used in conjunction with a floor ventilating system thereby cleansing the air in the pressroom. A flame using any energy source such as gas or oil can be employed within the oxidation chamber. Since the entire oxidation chamber is maintained at the 1400° F. level, it is not necessary for the air to pass directly through the flame, as is common with existing thermal oxidizing units that require the use of gas. Moreover, all the products of combustion are oxidized, well below the temperatures at which point the oxides of nitrogen are formed. Also, since all of the air passing the flame is preheated to the 1400° F. temperature, there is no quenching of the flame which produces oxides of nitrogen common in large power boilers.

In such a system, the heat of combustion released from the solvent ladened air can be used as a source of heat in the oxidation chamber as long as the gases are preheated above the solvent ignition temperature. The amount of heat of combustion which is generated will depend upon the amount of heat applied during preheating and the concentration of the solvent in the exhaust. Below a given solvent concentration level (approximately 7.4% LEL concentration) additional heat must be introduced into the oxidation chamber to maintain the 1400° F. level required for the oxidation process. However, above approximately 9.1% LEL, more heat than is required to maintain the oxidation process is generated. Because deterioration of the structure may result from the excess heat, it is necessary to regulate the amount of excess heat which is generated within the system.

One of the major drawbacks of conventional thermal oxidation systems, such as the one disclosed by Mueller, is the inability of these systems to function at high solvent level concentrations without deterioration. Such deterioration is costly in that it requires high maintenance costs and limits the useful life of the oxidation chamber.

It is, therefore, a prime object of the present invention to provide a method and appartus for energy conservation in a thermal oxidation system wherein the heat of combustion of the organic solvents is regulated to reduce fuel consumption and eliminate structure deterioration.

It is a second object of the present invention to provide a method and apparatus for energy conservation in a thermal oxidation system wherein the degree to which incoming exhaust gases are preheated is regulated in order to control the generated heat of combustion of the solvent and thus reduce fuel consumption.

It is a third object of the present invention to provide method and apparatus for energy conservation in a thermal oxidation system wherein the solvent level concentration is regulated in order to control the generated heat of combustion of the solvent and thus reduce fuel consumption.

It is a fourth object of the present invention to provide a method and apparatus for energy conservation in a thermal oxidation system wherein the thermal oxidation system is efficient at a wide range of solvent concentrations.

It is another object of the present invention to provide a method and apparatus for energy conservation in a thermal oxidation system wherein same can be utilized in conjunction with a floor sweep ventilating system in order to efficiently clean pressroom air.

It is still another advantage of the present invention to provide a method and apparatus for energy conservation in a thermal oxidation system wherein the floor sweep ventilation system becomes increasingly more efficient as the solvent concentration level increases.

It is a further object of the present invention to provide a method and apparatus for energy conservation in a thermal oxidation system wherein deterioration of the structure of the thermal oxidation chamber and damage to the energy recovery system are virtually eliminated at high solvent concentration levels.

It is still a further object of the present invention to provide method and apparatus for energy conservation in a thermal oxidation system wherein maintenance costs for the system are substantially reduced.

The present invention relates to a thermal oxidation system for removing organic solvents from the exhaust of a printing press or the like. A non-metallic preheater is utilized to preheat the exhaust to the solvent ignition temperature causing the solvent to generate its heat of combustion. The preheated exhaust is introduced into an oxidation chamber. By regulating the amount of heat of combustion, the chamber temperature can be controlled to minimize fuel consumption and eliminate deterioration of the structure. Regulations of the generated heat of combustion is achieved through control of the application of preheat or of the solvent concentration of the exhaust. The heat from the exiting gases from the oxidation chamber is recovered and utilized to perform the preheat operation.

In accordance with one aspect of the present invention, the thermal oxidation system includes an oxidation chamber and a preheater in the form of first and second regeneration chambers. Each of the regeneration chambers has a first port and a second port, the second port of each regeneration chamber being operably connected to the oxidation chamber. Inlet and outlet means, preferably in the form of ducts or conduits, are provided and are operably connected to each of the first ports of the regeneration chambers. Means are provided for regulating the flow through each inlet means and each outlet means. A controllable heat source, such as a gas or oil fuel flame, is situated within the oxidation chamber. Means for sensing the temperature of the oxidation chamber is situated therein.

A bed of heat exchanger elements are situated in each regeneration chamber, between the first and second ports thereof. Bypass means are operably connected to each of the regeneration chambers between the inlet means and a location within the bed therein such that gas directed along the bypass means circumvents at least a portion of the bed. Means are provided for controlling the flow of gas through the bypass means.

Preferably, the bypass control means is operably connected to the temperature sensing means to control the flow through the bypass means in accordance with the temperature in the chamber. The degree to which the incoming exhaust as a whole is preheated is thus regulated by the amount of flow in the bypass. In this manner, the temperature in the oxidation chamber can be maintained at a level such that little or no fuel is required to maintain the oxidation process and generation of destructive additional heat is eliminated. Thus, energy conservation in the thermal oxidation system is achieved by regulating the application of preheat to the exhaust gas, and thus the generated amount of heat of combustion, in order to maintain the amount of heat in the oxidation chamber at a given level. Preheating is accomplished by heating a bed of heat exchanger elements and then passing the incoming gas therethrough. Regulation of the application of preheat is accomplished by selecting the amount of incoming gas to bypass a portion of the preheated bed. By regulating the amount of gas which travels through the bypass, the temperature of the gas as it is introduced into the oxidation chamber, the amount of heat of combustion generated and thus the temperature of the chamber itself, is controlled.

In accordance with another aspect of the present invention, an exhaust collection duct is operably connected to the dryer section of each of the print stations in a multi-stationed printing press. A floor sweep duct is provided in the pressroom, the floor sweep duct being operably connected to the collection duct. A control damper is interposed between the floor sweep duct and the collection duct in order to regulate the flow from the floor sweep duct into the collection duct. The collection duct feeds the preheat section of the system, which in turn is connected to the thermal oxidation chamber. Means are provided in the oxidation chamber to sense the temperature thereof. The controllable damper on the floor sweep duct is regulated in accordance with the temperature in the oxidation chamber.

Since the exhaust from the floor sweep duct has a solvent concentration which is normally substantially lower than the solvent concentration from te dryer exhausts, the overall solvent concentration of the exhaust is regulated by the control of the floor sweep duct damper. In this manner, the heat of combustion generated by the solvent, as it is preheated above the ignition temperature, is regulated, thereby controlling the temperature in the oxidation chamber, in order to minimize fuel consumption and eliminate deterioration of the structure.

Preferably, each of the dryer sections of the printing stations is provided with a LEL (Lower Explosive Limit) control device which serves to increase the solvent concentration level in the dryer exhaust, while substantially reducing the volume thereof. This permits much more accurate control of the overall exhaust solvent level by operation of the floor sweep duct damper and, in addition, permits the use of a substantially smaller oxidation chamber.

Thus, solvent laden gases are collected from the dryer sections of the printing station and from the floor of the pressroom. The collected gases are combined to form the exhaust gas. The exhaust gas is preheated prior to introduction of same into the oxidation chamber. Once in the oxidation chamber, additional heat (if needed) is applied to the exhaust in order to promote oxidation. The proportions of the collected gases from the dryers and from the floor sweep duct, respectively, are regulated such that the solvent concentration of the exhaust gas and thus the generated heat of combustion, is controlled in order to minimize the amount of fuel required to heat the chamber and perform the floor sweep operation without additional cost or apparatus. During press cleanup (press not operating) floor sweep is accomplished through the same system, the entire capacity of the oxidation chamber being utilized for this purpose.

The the accomplishment of the above, and to any other objects which may hereinafter appear, the present invention relates to a method and apparatus for energy conservation in a thermal oxidation system for use with a multi-station rotogravure press or the like, as recited in the annexed claims and described in this specification, taken together with the accompanying drawings, wherein like numerals refer to like parts and in which:

Figure 1:
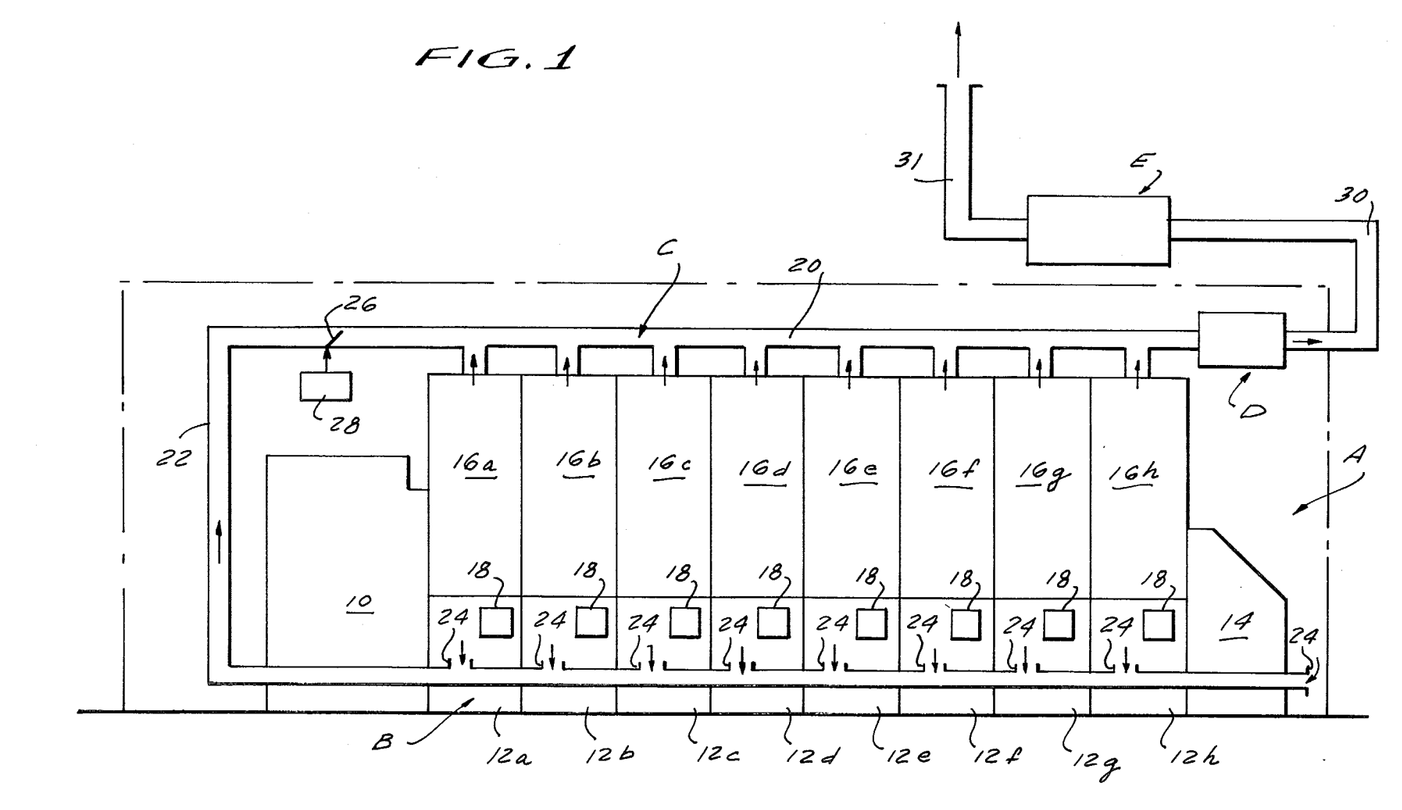
FIG. 1 is a side elevation view of a pressroom containing a multistation rotogravure in printing/packaging press of the type which can be utilized in conjunction with the present invention.

The present invention relates to method and apparatus for conservation of energy in a thermal oxidation system for use with a printing press of the type shown schematically in FIG. 1. FIG. 1 shows a pressroom, generally designated A, within which is situated a multicolor, multistation rotogravure printing/packaging press, generally designated B. Connected to the press is an exhaust system, generally designated C, comprising a blower, generally designated D, a thermal oxidation system, generally designated E, and the appropriate duct work connecting the blower D and the oxidation system E with each other, with the press and with an outlet to the environment, such as a chimney.

Rotogravure printing/packaging press B, situated within a pressroom A, is provided with a web feed and web tension control section 10, eight printing sections 12a through 12h and a cutting, creasing and/or stacking station 14. Above each of the printing sections 12a through 12h is provided a drying section 16a through 16h, respectively. Each of the printing sections 12a through 12h is provided with an individual control panel 18 upon which are situated the means for controlling the printing processes taking place in each section.

Above the drying sections 16a through 16h is an exhaust duct 20 which is individually connected to the exhaust portion of each of the dryer sections 16a through 16h. Exhaust duct 20 is additionally connected to a floor sweep duct 22 which has a plurality of input registers 24 situated near the floor on the pressroom in order to eliminate solvents which inevitably escape from the dryer sections. Preferably, a register 24 is provided for each printing section, each register being connected to duct 22. Along floor sweep duct 22 is provided a damper 26, controlled by a floor sweep damper control 28, which regulates the amount of exhaust which passes through the floor sweep duct 22 and into exhaust duct 20.

Exhaust duct 20 is connected to the input side of blower D, the output side of which is connected to the oxidation system E by means of a duct 30. The output side of oxidation system E is connected by means of a duct 31 to the environment through a chimney or the like (not shown).

It is noted that the particular configuration of the rotogravure press depicted in FIG. 1 forms no part of the present invention. The press has been shown schematically for purposes of illustration only and numerous different types of presses having a variety of different configurations and numbers of stages are well known to the art and can be used in conjunction with the thermal oxidation system of the present invention.

Figure 2:
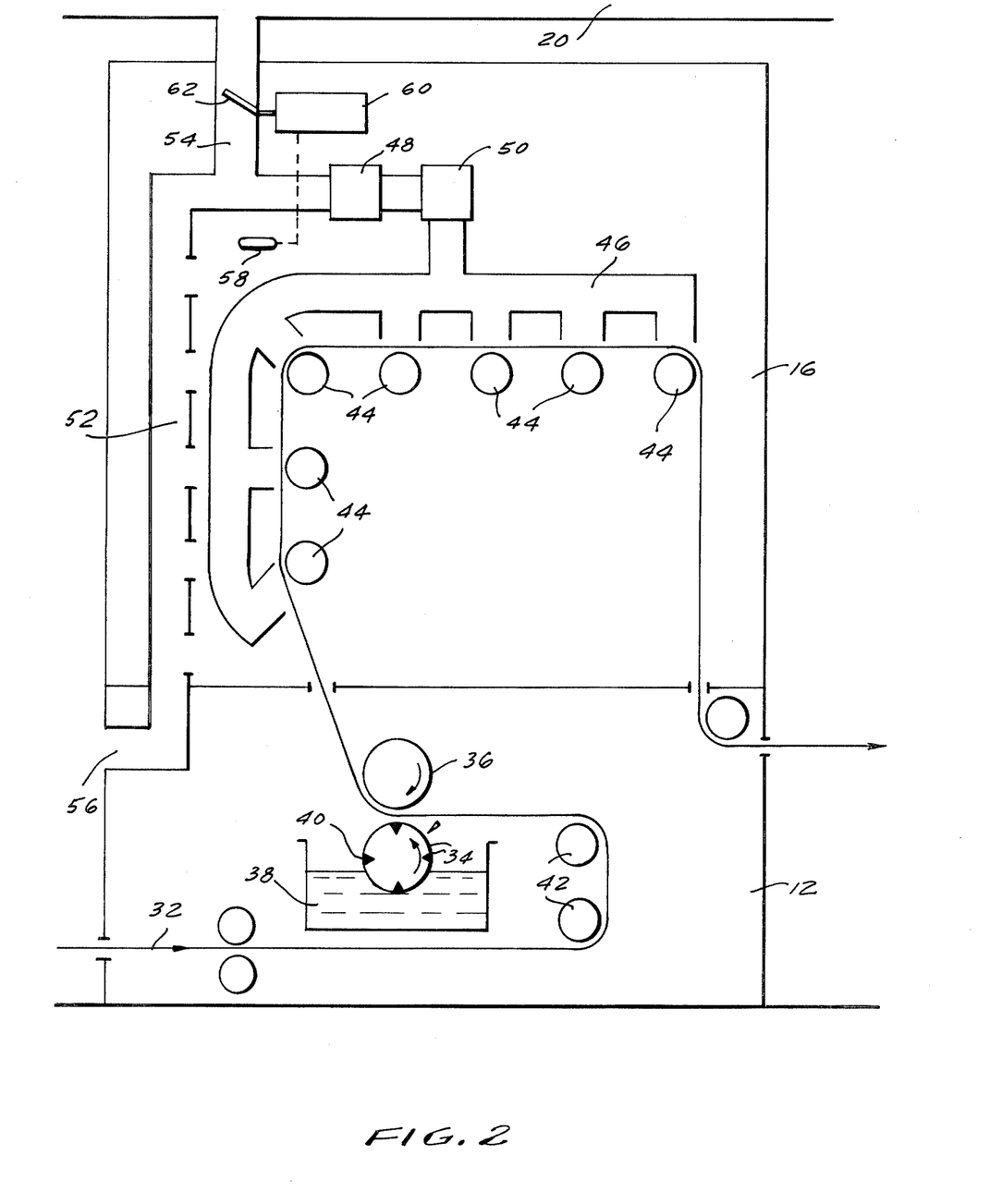
FIG. 2 is a side cross-sectional view of one of the printing stations of the rotogravure printing press shown in FIG. 1.

FIG. 2 is a pictorial representation of the inside of any of the printing stations 12 and the dryer section 16 associated therewith. The film, paper or paperboard web 32 enters the input side of the printing station 12 and is passed between a pair of rotatable cylindes 34, 36. Cylinder 34 is partially immersed in an ink bath 38 and is provided with a plurality of indentations or recess 40 distributed along the surface thereof in the appropriate locations. Indentations 40 pick up ink from ink bath 38 and transfer same to the surface of web 32, as the web passes between cylinders 34 and 36. The web then passes into the dryer section 16.

The ink utilized contains a variety of organic solvents which are evaporated in the dryer section 16. The web in the dryer section 16 is supported by a number of idler rollers 44 as it is passed in front of duct 46. Duct 46 has a plurality of openings adjacent the web along the path of travel thereof. Normally, an idler roller 44 is provided adjacent to each opening in order to support the web against the pressure of the incoming air from duct 46. Duct 46 is fed, by means of a blower 48 and a heater 50, with hot air in order to facilitate the evaporation of the organic ink solvents. The air from duct 46, after it is passed over web 32, is returned to blower 48 by means of duct 52, also situated within drying section 16, having a number of openings therealong to receive the incoming air. Up to this point what has been described is a completely enclosed recirculating and heating system for the dryer section.

It is, however, necessary to remove a portion of the recirculating air such that the concentration of the organic solvents therein does not reach a level where a spark or the like could cause an explosion. In the industry, organic solvent concentration is often measured in terms of LEL (lower explosive limit) and normally the organic solvent concentration within the dryer section is regulated so that it never exceeds 25% of the LEL. One way to achieve this regulation is to continuously replace the recirculating air by exhausting same through an outlet duct 54, which is connected to exhaust duct 20. As the solvent laden air passes through outlet duct 54 fresh air is sucked through inlet duct 56 from the pressroom. Inlet duct 56 is normally situated at the end of duct 54. This method of replacing the recirculating air within the dryer section in an unregulated manner is effective, but will require a relatively large thermal oxidation system to handle the large volume of exhaust having a relatively low solvent concentration.

In order to more efficiently regulate the solvent concentration in the recirculating air within dryer section 16 and thereby substantially cut down the volume of exhaust air, an LEL control is utilized within each of the dryer sections. LEL controls of a variety of different configurations are well known in the art. However, one such LEL control which is particularly suited for use in this situation is described in detail in copending application Ser. No. 902,551 filed May 3, 1978 and entitled LEL (Lower Explosive Limit) Control With Automatic Calibration Capability. The LEL control system comprises a solvent concentration sensor 58 which is situated to sense the solvent concentration in the recirculating air. Sensor 58 generates a signal which is proportional to the organic solvent concentration level. The signal from sensor 58 is transferred to the LEL control circuit 60 which pneumatically regulates the opening and closing of a damper 62 situated within outlet duct 54. In this manner, the solvent concentration of the air within the dryer section is accurately monitored and maintained at the desired level. The use of an LEL control considerably reduces the volume of air which passes through outlet duct 54 and thus the volume of air which must be thermally oxidized by the thermal oxidation system. Further, the LEL control acts to ensure that the solvent concentration within the dryer will never be high enough to cause an explosion and may be set up to automatically stop the press if the solvent concentration reaches a dangerous level due to malfunction. Thus, the LEL control serves both as a safety monitoring system and as a means of reducing the volume of exhaust which must be processed.

Figure 3:
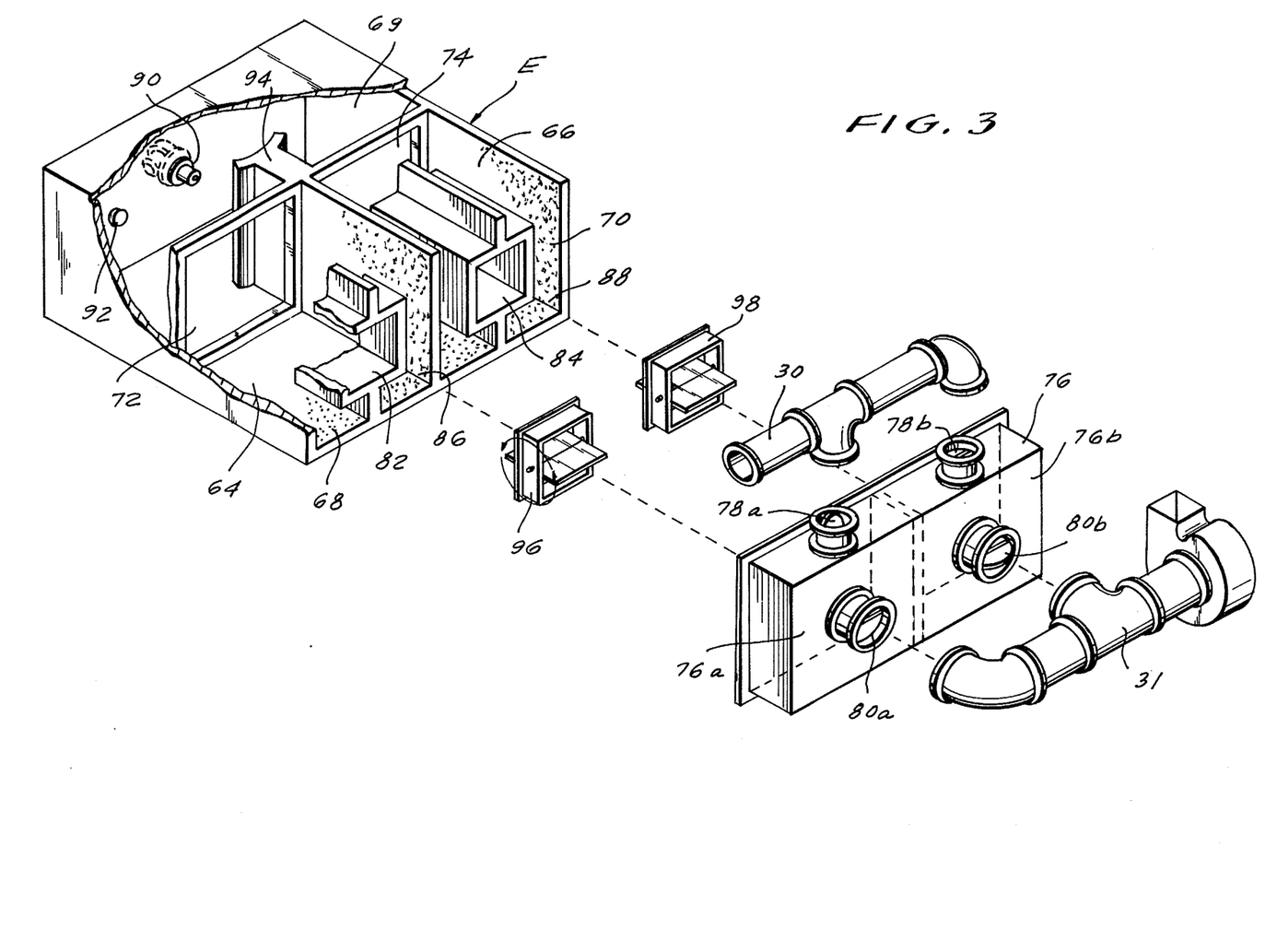
FIG. 3 is an exploded isometric view of a first preferred embodiment of the thermal oxidation system of the present invention.

FIG. 3 shows the first preferred embodiment of the thermal oxidation system of the present invention. The system itself comprises a steel structure divided into two regeneration chambers 64 and 66 and a thermal oxidation chamber 69. The chambers are lined with precast panels of conventional furnace materials, approximately six inches thick, such as are commercially available from the Quigley Company Inc. of New York, N.Y. The composition and thickness of the precast panels is determined, at least in part, by the operating temperatures of the chambers. In this example the chambers are designed to withstand a temperature of up to approximately 2000° F. but will normally be operated below this temperature. It is necessary, in order to prevent costly maintenance and a substantial shortening of useful life of the structure, to monitor and regulate the temperature in the system.

Each of the regeneration chambers 64 and 66 has a first port 68, 70, respectively and a second port 72, 74, respectively. Second ports 72 and 74 of regeneration chambers 64, 66 open into oxidation chamber 69. The first ports 68, 70 of the regeneraton chambers are connected to an input-output manifold 76, which in turn is connected to duct 30 from blower D and duct 31 leading to the chimney. Manifold 76 is divided into two sections, 76a, 76b which are operably connected to first ports 68, 70 respectively. Section 76a is connected to duct 30 through a damper 78a. Likewise, section 76b is connected to duct 30 through a damper 78b. In order to connect the system to the environment, section 76a is connected to duct 31 by means of a damper 80a and section 76b is connected to duct 31 by means of a damper 80b.

Each of the regeneration chambers 64, 66 is a four sided structure, with the first and second ports forming the remaining two opposite sides. Situated within each of the regeneration chambers 64, 66 is a bypass duct 82, 84 which has a length which is somewhat shorter than the length of the regeneration chamber in which it is situated. In other words, the bypass ducts 82, 84 do not extend the entire length of the regeneration chambers. The entire regeneration chamber, aside from the bypass duct itself, is filled with a heat exchanger substance preferably in the form of "pebbles" in order to form a pebble bed heat generator, of the type developed around 1929 by the United States Department of Agriculture to replace the heat exchanging structure for the classical brick checkerwork construction, commonly employed at that time is an air preheater for blast furnaces. Preferably, the "pebbles" are of the type sold by the Norton Company, of Akron, Ohio, under the trademark INTALOX, which have a saddle shape. Such a shape has been found to be effective to provide the maximum usable area for heat exchange with a minimum resistance to the gas flow through the column. The non-symmetrical nature of the saddle shape permits the elements to be packed randomly, while assuring maximum surface and minimum gas flow resistance. This type of bed serves to throughly mix the solvent laden air such that the air, as it enters the oxidation chamber, is uniform enough to permit oxidation as the exhaust exits the bed thereby reducing the size of the oxidation chamber by beginning the required dwell time of approximately 0.6 seconds immediately. It is noted that a screen or other barrier (not shown) is provided at the exit side of bypass ducts 82, 84 and at the second port of regeneration chambers 64, 66 such that the elements of the pebble bed are retained in the appropriate locations.

The oxidation system operates as follows, neglecting for the moment the functioning of the bypass ducts 82, 84. Solvent laden air from the dryer sections 16 is collected in exhaust duct 20 and moved by means of blower D, through duct 30. Inlet damper 78a is opened and inlet damper 78b is closed such that the solvent laden air enters only section 76a of manifold 76. The solvent laden air passes through first port 68 of regeneration chamber 64 and then through the pebble bed 86 contained therein. Pebble bed 86 has been preheated by passing the air exiting the oxidation chamber 69 therethrough, during a previous cycle. The solvent laden air passing through pebble bed 86 is preheated by the bed, which is designed to efficiently transfer the heat stored therein to the solvent laden air. The solvent laden air passes along the entire length of regeneration chamber 64, and thus through the pebble bed 86 situated therein, until it reaches second port 72, through which it passes. The preheated air is then introduced into oxidation chamber 69.

Oxidation chamber 69 is provided with a burner 90 and a temperature sensor 92. The burner is connected to a source of natural gas, oil or some other appropriate fuel (not shown) and the size of the flame, and therefore the amount of heat applied to the solvent laden air in the oxidation chamber 69, can be regulated. It is necessary, in order to transform 99% of the organic solvents into harmless carbon dioxide and water vapor, to heat the solvent laden air to at least 1400° F., for about 0.6 seconds. Thus, the oxidation chamber must be designed such that the solvent laden air passing therethrough will be at the oxidation temperature for at least the necessary time. In order to prevent any of the solvent laden air from "short circuiting" a portion of the oxidation chamber and thus passing from one regeneration chamber to the other in less than the required time, a baffle structure 94 is provided within the chamber. However, since the entire chamber is maintained 1400° F. level or above, it is not necessary in this system for the air to pass directly through the flame, as common with existing thermal oxidation unit that require the use of gas as a fuel.

The oxidized air exits the oxidation chamber 69 through second port 74 of regeneration chamber 66. The oxidized air then travels along the length of regeneration chamber 66, thus through the pebble bed 88 situated therein, through first port 70 and into section 76b of manifold 76. Damper 80b in section 76 is opened such that the oxidized air travels through duct 31 and subsequently to the environment. As the oxidized air passes through pebble bed 88, much of the heat therein is transferred to the pebble bed. This heat will be used to preheat the incoming solvent laden air during the next cycle.

After a given time, for example 10 minutes, when pebble bed 86 no longer has sufficient heat to preheat the solvent laden incoming air, and pebble bed 88 has absorbed as much heat as possible from the outgoing oxidized air, the air flow path is reversed. This is accomplished by closing damper 78a and opening damper 78b such that incoming air from duct 30 goes into section 76b of manifold 76. In addition, damper 80b is closed and damper 80a opened such that oxidized air from regeneration chamber 64 can enter duct 31 and thus be transferred to the environment. In this mode, the solvent laden air passes through first port 70 of regeneration chamber 66, through pebble bed 88, which preheats same, and then through second port 74 into oxidation chamber 69. The oxidized air from oxidation chamber 69 enters regeneration chamber 64 through second port 72, wherein the heat thereof is utilized to reheat pebble bed 86, the oxidized air passes along the length of regeneration chamber 64 to first port 68 thereof and finally through section 76a of manifold 76 and damper 80a into duct 31.

It should be appreciated that the oxidation system of the present invention may include more than two pebble beds. However, for simplicity of explanation, only two pebble beds have been described herein for purposes of illustration.

From this brief description it can be seen that by merely closing and opening the appropriate dampers, the air flow through the oxidation system can be alternately directed first through one regeneration chamber and then the other, in order to recover the heat of the oxidized outgoing air and utilize same to preheat the incoming solvent laden air. Such a system, when operated at trace LEL, results in energy savings of approximately 85% over the use of an oxidation chamber without heat recovery. Thus, at trace LEL, only approximately 15% of the fuel which would normally be required is necessary to perform the oxidation process through the use of the pebble heat generator. As the solvent level increases above trace LEL, as described below, the heat of combustion of the solvents can be utilized to further reduce the fuel requirements to nearly zero.

In conjunction with the above description, it must be appreciated that organic solvents of the type considered herein will generate considerable amounts of heat combustion, when same are preheated above their ignition temperatures. The amount of heat of combustion generated by the solvent laden air will depend upon the temperature to which the organic solvents are preheated and the concentration of organic solvents present. It should also be recalled that the oxidation chamber has a certain permissible operation temperature which, if exceeded, will cause deterioration thereof requiring costly maintenance and reducing the useful life of the chamber. It is the essence of applicant's invention to control the amount of heat of combustion generated by the solvent laden air, in order to minimize the fuel consumption of the oxidation chamber as well as to maintain the temperature therein below the level where the structure will deteriorate. This result may be achieved by two separate methods, represented herein by the first preferred embodiment and second preferred embodiment, respectively.

In the first preferred embodiment, the heat of combustion generated by the solvent laden air is controlled by controlling the amount of preheat applied. This is accomplished through the use of bypass ducts 82 and 84 and dampers 96 and 98 associated therewith. Damper 96 controls the amount of solvent laden air which passes from section 76a of manifold 76 through bypass duct 82. Likewise, damper 98 controls the amount of solvent laden air which passes from section 76b of manifold 76 through bypass duct 84.

Figure 4:
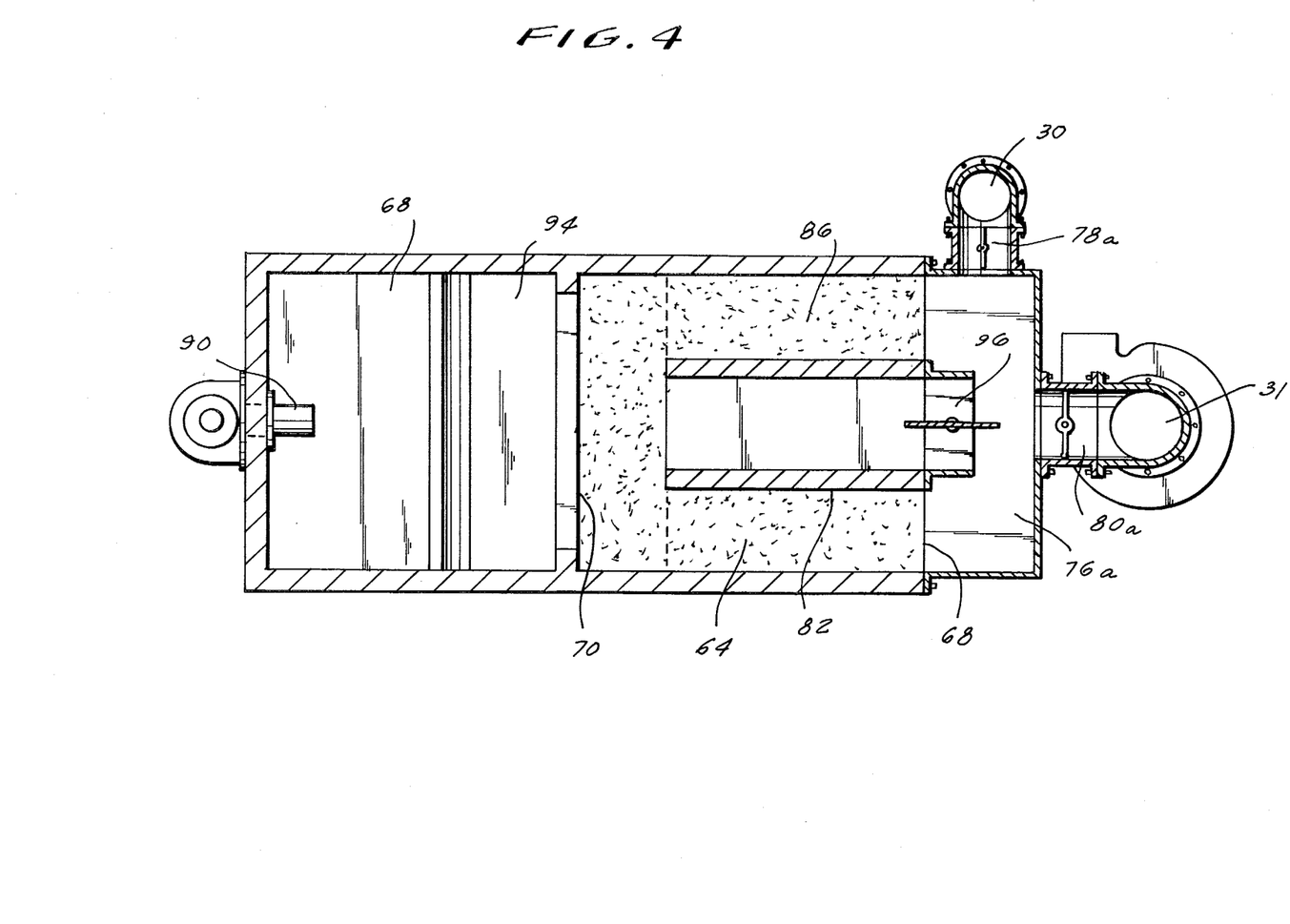
FIG. 4 is a cross-sectional view of the first preferred embodiment of the thermal oxidation system as shown in FIG. 3.

The manner in which the bypass system operates is at best illustrated with reference to FIG. 4, which shows a cross-sectional view of the system taken through regeneration chamber 64. As can be seen in this drawing, when damper 96 is opened, solvent laden air is permitted to pass from section 76a through bypass duct 82. The air in duct 82 passes through only a small portion of the pebble bed 86, bypassing the portions thereof surrounding the bypass duct. In this manner, the air which passes through the bypass duct 82 is preheated to a much lesser extent than the air which passes through the remainder of regeneration chamber 64. Therefore, the amount of preheat applied to the solvent laden air, as a whole, passing through the regeneration chamber is regulated by the opening and closing of the bypass damper. As a result, the heat of combustion generated by the solvents in the solvent laden air is controlled such that virtually no additional heat need by imparted to the solvent laden air within the oxidation chamber 69 to sustain the oxidation process and in addition the temperature within the oxidation chamber 69 can be maintained below destructive levels. In this manner, fuel consumption is reduced to almost zero (it is more convenient to keep the burner flame at the pilot level instead of shutting if off completely) and the maintenance and replacement costs for the oxidation chamber are virtually eliminated. Bypass dampers 96 and 98 are connected to operate together such that the efficiency of both the preheat bed and the exhaust bed is reduced simultaneously.

The system, as it has been considered up till now, has been run with the floor sweep duct damper closed so that only exhaust from the dryer sections of the printing stations has been processed. When permitted, the floor sweep ventilation system can be vented directly to the atmosphere while the press is running. This may be accomplished by an additional duct section and blower (not shown in the drawings) directly connecting duct 22 to duct 31 and a damper (also not shown) which controls the flow therethrough. This damper will be opened only when the press is running. Since the solvent level concentration of the pressroom air is relatively small during the running of the press, this mode of operation will not adversely affect the environment. In the first preferred embodiment of the system, processing of the air from the floor sweep ventilation system will occur only during press clean up (after the press has ceased to operate), at which time the solvent level concentration thereof is somewhat higher. However, during press clean up, the bypass dampers will remain closed because the solvent concentration of the air from the floor sweep ventilation system will normally still be below the level wherein the amount of heat of combustion generated is sufficient to sustain the oxidation process.

Figure 5:
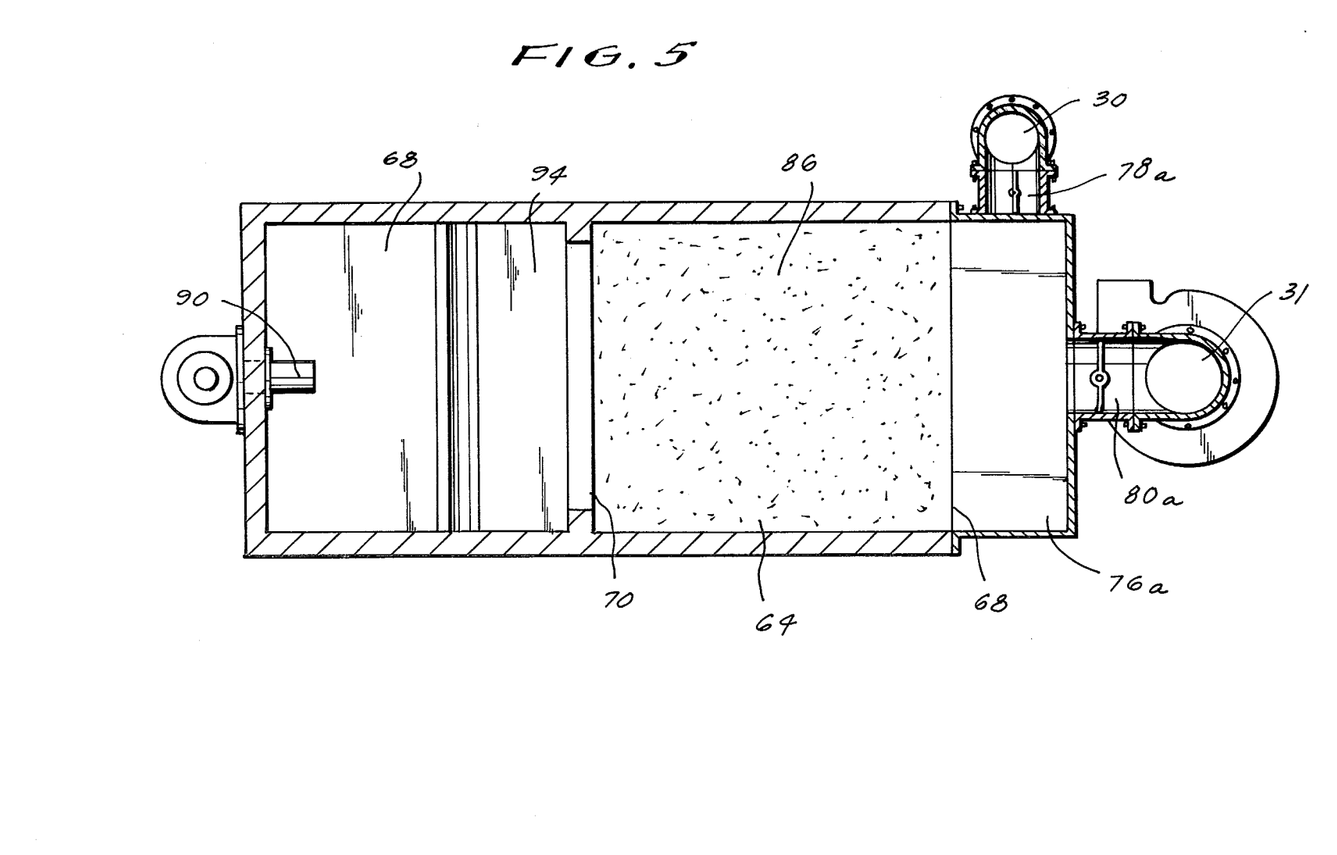
FIG. 5 is a cross-sectional view of a second preferred embodiment of the thermal oxidation system of the present invention.

As illustrated in FIG. 5, which shows the second preferred embodiment of the present invention, the oxidation system described above can be utilized without the bypass ducts and dampers. In this embodiment, the pebble bed will fill the entire internal portion of each of the regeneration chambers 64, 66, and there is, therefore no means of controlling the amount of preheat which is applied to the incoming solvent laden air. Thus, at high solvent level concentrations (approximately 9.1% LEL or above) the heat of combustion generated by preheating the solvent laden air causes a heat build up in the oxidation chamber which will eventually deteriorate the structure of same. In order to overcome this problem, the floor sweep damper control 28 (see FIG. 1) is operably connected to the temperature sensor 92 located within the oxidation chamber. As the temperature within the oxidation chamber rises, the floor sweep damper control 28 causes damper 26 to open thereby introducing additional air from the pressroom floor into duct 20 and thus into the oxidation system. Since the solvent concentration of the air in the pressroom is substantially lower than the solvent concentration of the air from the dryer sections of the press, the combination of the air from each of these sources has a solvent concentration which is substantially less than the solvent concentration of the air from the dryer sections alone.

It should be appreciated that as the solvent concentration of the dryer exhaust increases, damper 26 will open more, thereby increasing the volume of air passing through the floor sweep ventilation system. Thus, the efficiency of the floor sweep ventilation system is increased during periods of greatest necessity, such that the atmosphere in the pressroom is always maintained at acceptable solvent concentration levels. Further, during pressroom clean up (after the operation of the press has ceased) when all of the exhaust processed by the oxidation system comes from the floor sweep ventilation system (as described below), the oxidation system of the present invention will consume only 15% of the amount of fuel required by a system without heat recovery, even though the solvent level concentration is relatively low. Thus, during pressroom clean up, the entire capacity of the oxidation system is efficiently utilized to eliminate solvents in the pressroom air.

By regulating the amount of air introduced from the floor sweep ventilation system, it is possible to accurately regulate the solvent concentration of the preheated air as same enters the oxidation chamber and thus the amount of heat of combustion generated thereby. By controlling the generated heat of combustion it is possible to run the oxidation system with virtually no fuel and prevent deterioration of the structure and at the same time provide an efficient floor sweep ventilation system without any additional cost or equipment.

As mentioned above, it is common in the industry to include a LEL monitor and control within each of the dryer sections. Such a control permits the accurate regulation of the solvent concentration of the air exiting the dryer sections while substantially reducing the volume of the exhaust. If the system of the second preferred embodiment of the present invention is utilized in conjunction with LEL controls in each dryer section, it will be possible to more accurately control the solvent concentration of the combined floor sweep ventilation system and dryer ventilation system in order to maintain the amount of heat of combustion generated within the oxidation chamber to the most efficient level.

Thus, the second preferred embodiment controls the amount of heat of combustion generated by the solvents within the oxidation chamber, as does the first preferred embodiment, but has the additional advantage of providing a floor sweep ventilation system at no additional cost. Further, like the first preferred embodiment, the second preferred embodiment may be utilized during clean up, when the press has ceased to function, solely as a pressroom floor sweep ventilation system, without duplication of equipment.

It should also be noted that further energy conservation can be achieved by utilizing the unrecovered heat present in the output of the oxidation system. A certain amount of heat remains uncollected by the pebble bed and the temperature of the exhaust from the oxidation system may be in excess of 300° F. This air can be used to heat oil or other fluid which can then be circulated through the dryer sections to heat the air therein.

Figure 6:
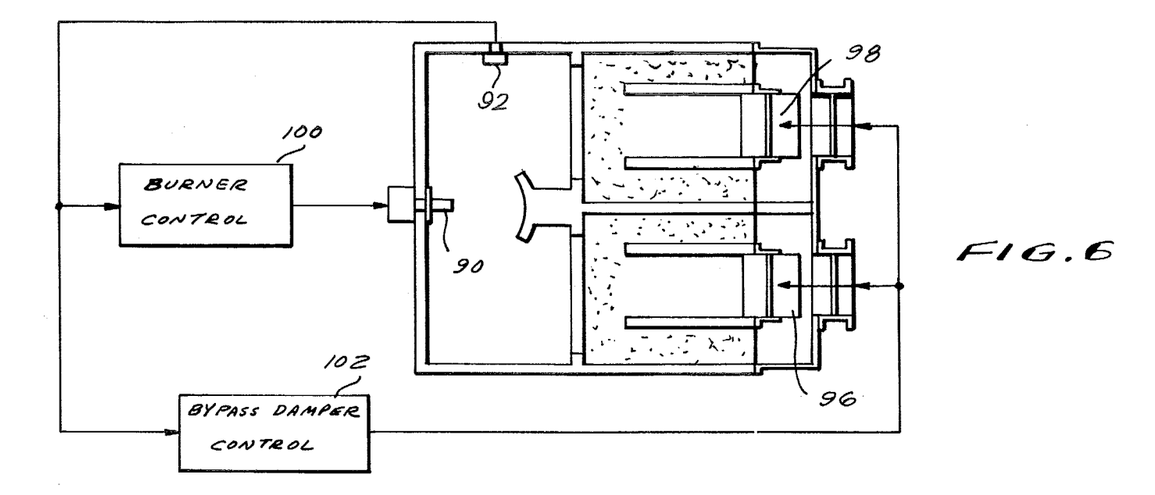
FIG. 6 is a schematic view of the control system for the first preferred embodiment of the thermal oxidation system of the present invention.

FIG. 6 is a schematic diagram of the bypass damper control system of the first preferred embodiment of the present invention. As shown in FIG. 6, the output of temperature sensor 92, of conventional design, is connected to a burner control 100. Sensor 92 generates an electric signal which is a function of the temperature in the chamber. A burner control 100, of conventional design, is provided to regulate the amount of fuel which is introduced into burner 90, and therefore the amount of additional heat which is applied to the solvent laden gases within the oxidation chamber. The regulation of the fuel by burner control 100 can be performed in any conventional manner, such as through the use of a solenoid operated valve or the like. Preferably, burner control 100 is designed to provide a minimum amount of fuel to burner 90 such that, even when the temperature in the oxidation chamber is above the necessary level, the burner flame is at the pilot level. This eliminates the necessity for subsequently relighting the flame. Through the use of the control loop described, only the amount of heat will be applied to oxidation chamber 69 by burner 90 which is required to sustain the oxidation process.

As indicated above, the heat of combustion generated by the incoming solvent laden air, as same is preheated above the ignition temperature thereof, is often more than enough to maintain the oxidation chamber at the required 1400° F. to sustain the oxidation process. Once the amount of heat of combustion which is generated causes the oxidation chamber temperature to rise above a preset level, the bypass system of applicant's first preferred embodiment is utilized to prevent the generation of any additional excess heat. Thus, temperature sensor 92 is also connected to bypass damper control 102. Damper control 102 is a conventional, commercially available system which converts the signal output of sensor 92 into a pneumatic or hydraulic pressure or an electric signal. Thus, when bypass damper control 102 senses an input signal above a given magnitude, the bypass dampers (dampers 96 and 98 are connected to operate together) of the oxidation system will be opened. Since the output of control 102 is a function of the temperature sensed, the dampers will open to a greater degree the higher the temperature. Bypass damper control 102 is pneumatically, hydraulically or electrically connected to the bypass dampers, in a manner which is well known in the art, such that the position of the dampers can be accurately controlled in accordance with the sensed temperature. Dampers 96 and 98 may be pneumatically (or hydraulically) operated or may be driven by an electric motor. However, pneumatically or hydraulically dampers are preferred because of the explosive environment. Thus, bypass damper control 102 is preferably an electric to pneumatic (or hydraulic) transducer which regulates the pneumatic (or hydraulic) pressure in accordance with an electric input signal generated by temperature sensor 92. However, entirely electrical systems can be used if same are suitably protected against the explosive environment.

Figure 7:
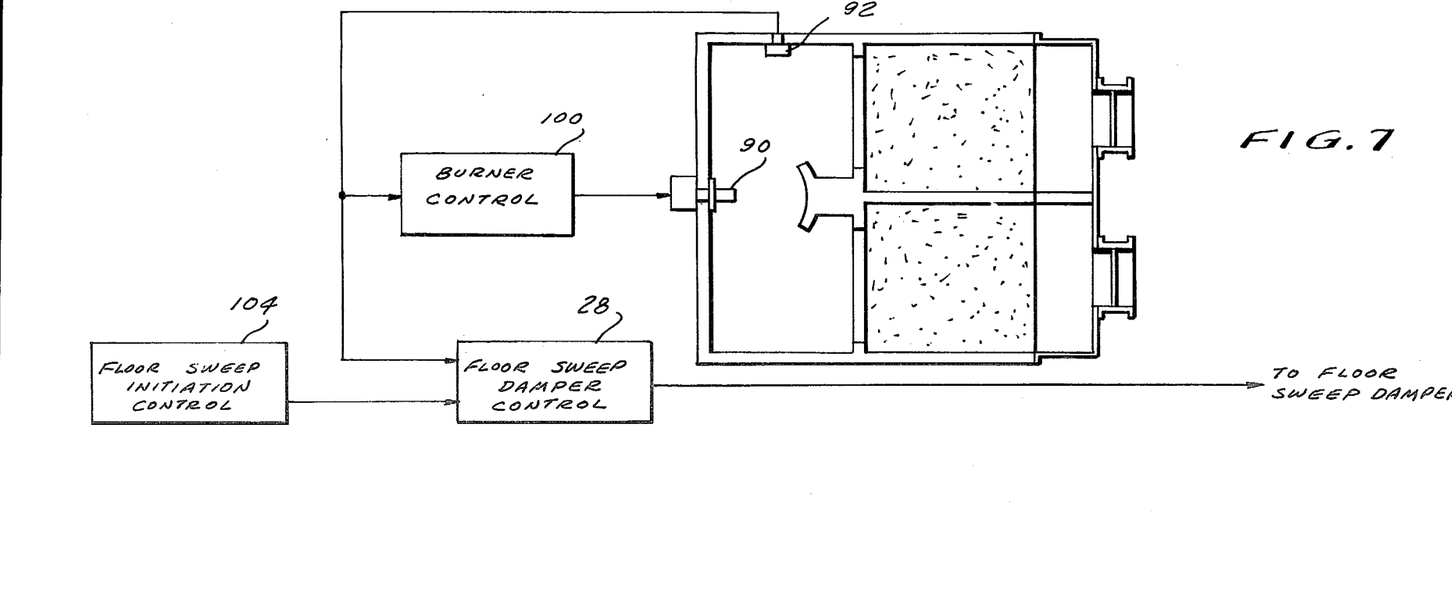
FIG. 7 is a schematic view of the control system for the second preferred embodiment of the thermal oxidation system of the present invention.

FIG. 7 is a schematic diagram of the control system for the second preferred embodiment. In this system, the temperature sensor 92, burner control 100 and burner 90 operate essentially as described above. However, in this embodiment, the signal from temperature sensor 92 is transmitted to floor sweep damper control 28 which, like bypass damper control 102, is an electrical to pneumatic or hydraulic (or electric) transducer which causes the floor sweep damper 26 to open or close in accordance with the signal from temperature sensor 92. In this case, when the temperature sensed within the oxidation chamber reaches a level above a preset temperature, burner control 100 sets burner 90 at the pilot condition. As the temperature exceeds this level, the floor sweep damper control 28 will cause damper 26 to open, thereby permitting air from the floor sweep ventilation system into the duct 30 and thus reducing the solvent concentration of the solvent laden gases in the oxidation system.

It should also be noted that floor sweep damper control 28 has a second input, which is connected to the output of floor sweep initiation control 104, which is located at a convenient position, such as the press master control panel. Floor sweep initiation control 104 serves to generate a signal actuating floor sweep damper control 28 to open damper 26 all the way when the press has ceased to function and the oxidation system is to be used exclusively for floor sweep purposes. In this latter mode, the signal from temperature sensor 92 will have no effect on the position of damper 26 but will continue to regulate burner control 100 so as to assure that the oxidation chamber remains at the necessary temperature to perform the oxidation process. When the system is in the floor sweep mode, additional heat will normally be applied to the oxidation chamber through burner 90 because the solvent concentration of the exhaust from the floor sweep ventilation system will normally not be sufficiently high to generate enough heat of combustion to sustain the system without fuel consumption.

It should now be appreciated that the present invention relates to two methods and apparatus for controlling the amount of heat of combustion which is generated by solvent laden gases preheated in an oxidation system to a level above their ignition temperature. The first method relates to the regulation of the degree of preheat which is applied to the solvent laden gases, as a whole. The second method relates to the use of the floor sweep ventilation system to reduce the solvent concentration of the exhaust in a controlled manner thereby regulating the amount of heat of combustion generated.

Thus, the present invention is a method and apparatus for use on a thermal oxidation system for use on a multi-station rotogravure packaging/printing press, which not only minimizes the amount of fuel required by the oxidation system but also reduces the maintenance costs and enhances the useful life of the oxidation structure. These results are accomplished by monitoring of the temperature within the oxidation chamber and the control of the amount of heat of combustion generated in accordance therewith.

In addition, the second preferred embodiment includes a floor sweep ventilation system which operates continuously as the press is operated. As more solvent is used in each printing unit, a higher solvent concentration will be present in the dryer exhaust and more solvent will be evaporated into the pressroom air. The increased solvent concentration in the dryer exhaust will cause an increase in the floor sweep volume, thereby automatically increasing the efficiency of the floor sweep system in order to clean pressroom air more efficiently.

While only two preferred embodiments of the present invention have been described herein for purposes of illustration, it is obvious that many modifications and variations could be made thereto. It is intended to cover all of these variations and modifications that fall within the scope of applicant's invention as defined by the following claims.

I claim:

1. A thermal oxidation system for removing solvents from the dryer exhaust of a printing press or the like comprising: an oxidation chamber; means for preheating the exhaust prior to the entrance thereof into said oxidation chamber, said preheat means comprising a heated bed of ceramic heat exchanger elements having first and second sections, said sections being situated such that exhaust flowing therethrough normally travels through each of said sections in sequence prior to entrance into said oxidation chamber, and means for regulating the degree of preheat applied to the exhaust, said regulating means comprising: means for bypassing only one of said bed sections and means for controlling the portion of the exhaust passing through said bypass means.

2. The system of claim 1, wherein said bed of heat exchanger elements is situated within an open ended enclosure, one of said open ends being operably connected to said oxidation chamber, the other of said open ends being operably connected to receive the exhaust and wherein said bypass means comprises a passageway extending from said other of said open ends through said one section and terminating at the beginning of said other section, such that said portion of the exhaust passing through said bypass means enters said other bed section without first traversing said one bed section.

3. The system of claim 2, wherein said controlling means comprises a movable damper situated at the entrance of said passageway.

4. The system of claim 3, further comprising means for positioning said damper in accordance with the temperature in said oxidation chamber.

5. A thermal oxidation system for removing solvents from the relatively high solvent concentration dryer exhaust of a printing press or the like comprising an oxidation chamber, means for preheating the exhaust prior to entrance into the oxidation chamber and means for regulating the solvent concentration of the exhaust prior to preheating same, said concentration regulating means comprising means for collecting relatively low solvent concentration gases from the vicinity of the press and means for mixing said collected gases with said relatively high solvent concentration dryer exhaust in regulated proportions.

6. The system of claim 5, further comprising means for regulating the proportions of the collected gas and exhaust mixed in said mixing means in accordance with the temperature of said oxidation chamber.

7. The system of claim 6, wherein said collecting means is a floor sweep ventilation system.

8. The system of claim 7, wherein said regulating means comprises means for controlling the flow through said floor sweep ventilating system.

9. The system of claim 8, wherein said floor sweep ventilation means may be operative when the dryer of the press is not operating.

10. The system of claim 5, further comprising means for sensing the solvent concentration level within the dryer section of the press and means for regulating the solvent concentration of the dryer exhaust in accordance with said sensed concentration.

11. A method for removing solvents from the dryer exhaust of a printing press or the like comprising the steps of:
heating a bed or ceramic heat exchanger elements having first and second sections;
passing a first portion of the exhaust through each of the first and second sections of the bed in sequence;
passing a second portion of the exhaust through only one of the first and second sections so as to bypass the other section;
regulating the first and second exhaust portions so as to control the degree to which the exhaust is preheated;
introducing the preheated exhaust into an oxidation chamber; and
heating the oxidation chamber to promote oxidation of the exhaust therein.

12. The method of claim 11, wherein the step of regulating comprises the steps of:
sensing the temperature in the oxidation chamber; and
varying the first and second exhaust portions in accordance with the sensed temperature.

13. A method for removing solvents from the dryer exhaust of a printing press or the like comprising the steps of:
collecting relatively high solvent concentration exhaust from the dryer sections of the printing press;
collecting relatively low solvent concentration gases from the vicinity of the press;
mixing the relatively high solvent concentration exhaust with the relatively low solvent concentration gases to form a mixture;
regulating the proportions of the relatively high solvent concentration exhaust and relatively low solvent concentration gas in the mixture;
preheating the mixture;
introducing the preheated mixture into an oxidation chamber; and heating the oxidation chamber to promote oxidation of the gas mixture therein.

14. The method of claim 13, further comprising the step of controlling the solvent concentration of the exhaust from the dryer.

15. The method of claim 13, wherein the step of regulating comprises controlling the amount of relatively low solvent concentration gases collected.

16. The method claim 13, wherein the step of collecting the low solvent concentration gases comprises drawing the gases in the vicinity of the press into a conduit leading to the entrance of the preheat portion of the oxidation chamber.

* * * * *